United States Patent [19]

Peterson et al.

[11] Patent Number: 5,632,829
[45] Date of Patent: *May 27, 1997

[54] PNEUMATIC IN-LINE SKATE WHEEL

[75] Inventors: Tom Peterson; Neal Piper, both of Huntington Beach, Calif.

[73] Assignee: The Hyper Corporation, Huntington Beach, Calif.

[*] Notice: The term of this patent shall not extend beyond the expiration date of Pat. No. 5,630,891.

[21] Appl. No.: 502,828

[22] Filed: Jul. 14, 1995

Related U.S. Application Data

[63] Continuation-in-part of Ser. No. 354,374, Dec. 12, 1994.

[51] Int. Cl.⁶ ............................................ A63C 17/22
[52] U.S. Cl. .......................... 152/165; 152/329; 152/339.1; 152/384; 152/452; 152/511; 152/DIG. 18; 280/11.22; 301/5.3
[58] Field of Search ........................... 152/7, 9, 165, 152/166, 325, 329, 327, 320, 322, 452, 302, 344.1, 345.1, 384, 501, 339.1, 511, DIG. 18; 301/5.3, 35.51; 280/11.22, 11.23; 137/223; 251/82, 324, 325, 320, 353; 273/65 C

[56] References Cited

U.S. PATENT DOCUMENTS

| | | |
|---|---|---|
| 240,812 | 5/1881 | Coleman . |
| D. 301,908 | 6/1989 | Olson et al. . |
| D. 321,393 | 11/1991 | Olson et al. . |
| D. 323,540 | 1/1992 | Graham . |
| D. 324,713 | 3/1992 | Rubin . |
| D. 334,225 | 3/1993 | Graham . |
| 495,064 | 4/1893 | Schrader ........................ 273/65 C |
| 558,606 | 4/1896 | Hardman . |
| 559,848 | 5/1896 | Gulline . |
| 988,533 | 4/1911 | Zverina . |
| 1,618,496 | 2/1927 | Ware . |
| 1,697,485 | 1/1929 | Ware . |
| 1,981,720 | 11/1934 | Crane ............................ 273/65 C |
| 2,068,947 | 1/1937 | Frank . |
| 2,262,714 | 11/1941 | Ware ............................. 301/5.3 |
| 2,634,785 | 4/1953 | Tubbs . |
| 2,665,521 | 1/1954 | Ford . |
| 2,737,969 | 3/1956 | Iknayan . |
| 2,933,120 | 4/1960 | Siedow . |
| 3,410,299 | 11/1968 | Whittington . |
| 3,465,780 | 9/1969 | Duymelinck et al. . |
| 3,877,710 | 4/1975 | Nyitrai ........................... 280/11.23 |
| 3,900,203 | 8/1975 | Kukulowicz . |
| 4,077,456 | 3/1978 | Smith . |
| 4,218,098 | 8/1980 | Burton . |
| 4,273,345 | 6/1981 | Ben-Dor et al. . |
| 4,294,455 | 10/1981 | Krueger . |
| 4,340,080 | 7/1982 | Lefrancois . |
| 4,379,104 | 4/1983 | Koorevaar . |
| 4,387,071 | 6/1983 | Kirkhuff . |
| 4,603,025 | 7/1986 | Landay et al. . |
| 4,603,868 | 8/1986 | Schutz . |
| 4,666,169 | 5/1987 | Hamill . |
| 4,909,523 | 3/1990 | Olson . |
| 5,028,058 | 7/1991 | Olson . |
| 5,048,848 | 9/1991 | Olson et al. . |
| 5,068,956 | 12/1991 | Malewicz . |
| 5,092,614 | 3/1992 | Malewicz . |
| 5,190,301 | 3/1993 | Malewicz . |
| 5,251,920 | 10/1993 | McHale . |
| 5,312,844 | 5/1994 | Gonsior et al. .................. 152/DIG. 18 |
| 5,346,231 | 9/1994 | Ho .................................. 280/11.22 |
| 5,524,913 | 6/1996 | Kulbeck .......................... 280/11.22 |

*Primary Examiner*—Geoffrey L. Knable
*Attorney, Agent, or Firm*—Fulwider Patton Lee & Utecht LLP

[57] ABSTRACT

A pneumatic in-line skating wheel having a tire body and central hub chemically bonded during a polyurethane casting process and further including an annularly encapsulated air bladder centrally spaced within the tire body to provide shock absorption. The bladder in one embodiment is in communication with a valve for inflation and deflation thereof such that the overall tire resiliency may be adjusted, enabling adjustable performance characteristics of the wheel. One embodiment of the valve incorporates a resilient core within a rigid barrel and stretchable to allow an inflation needle to stretch the core and drive a poppet off a seat at the interior end of the barrel.

9 Claims, 4 Drawing Sheets

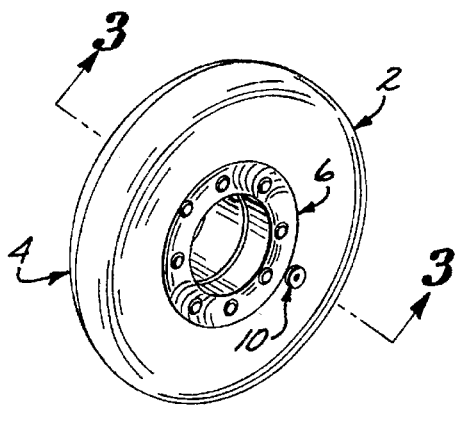
FIG. 1
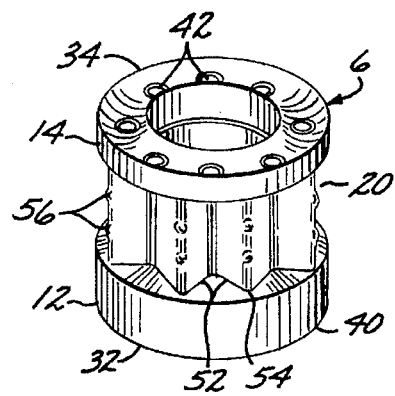
FIG. 2
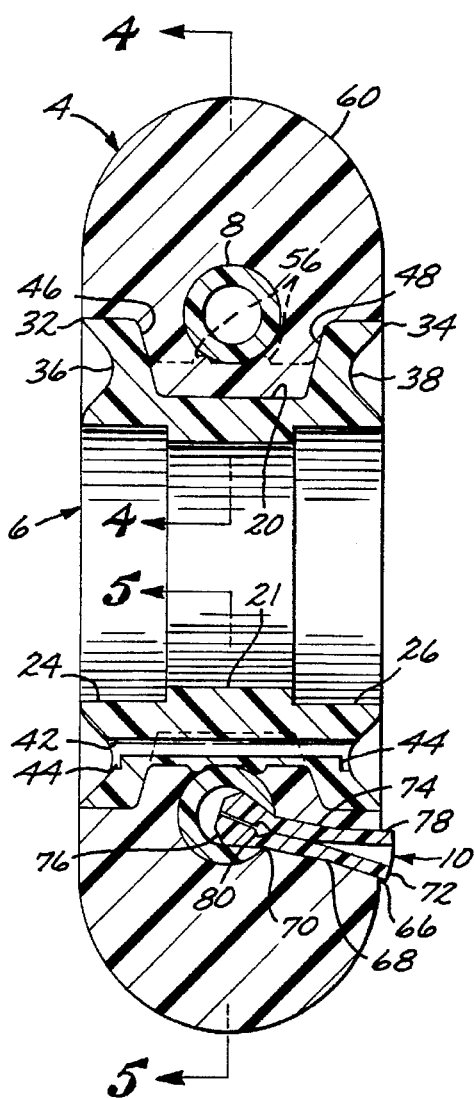
FIG. 3
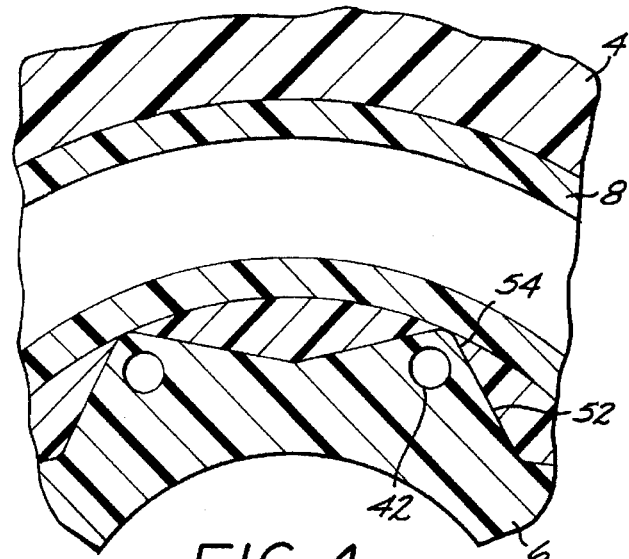
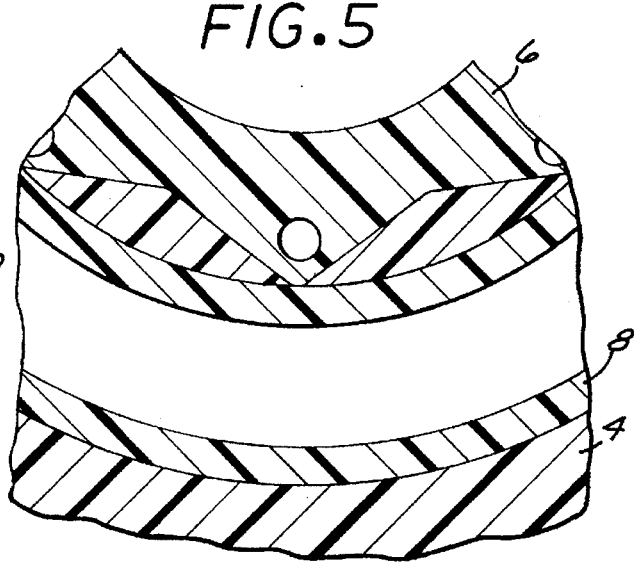
FIG. 4
FIG. 5

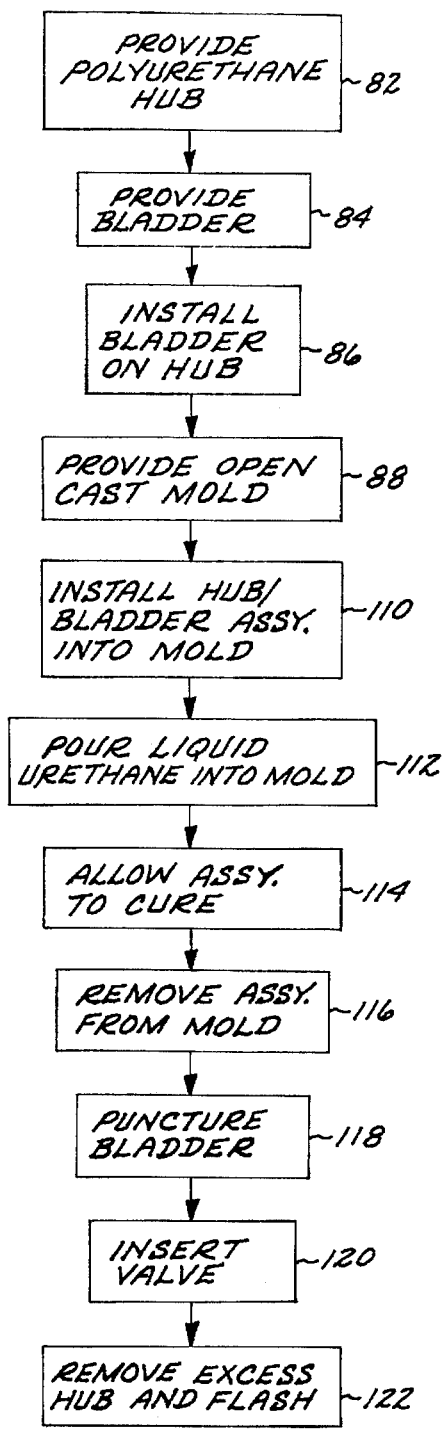
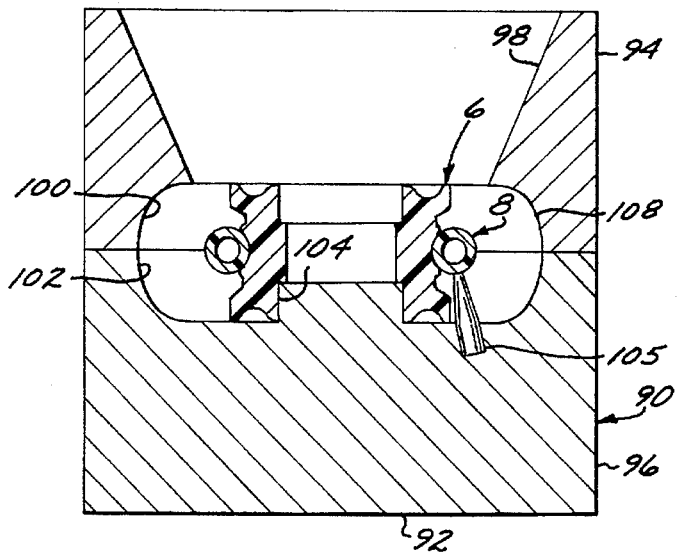
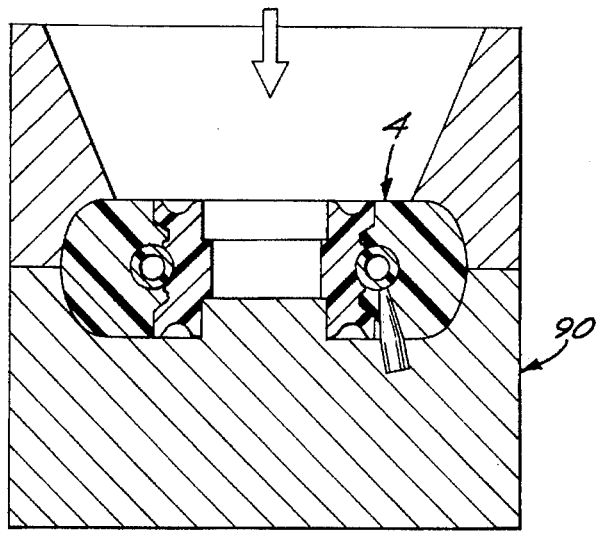

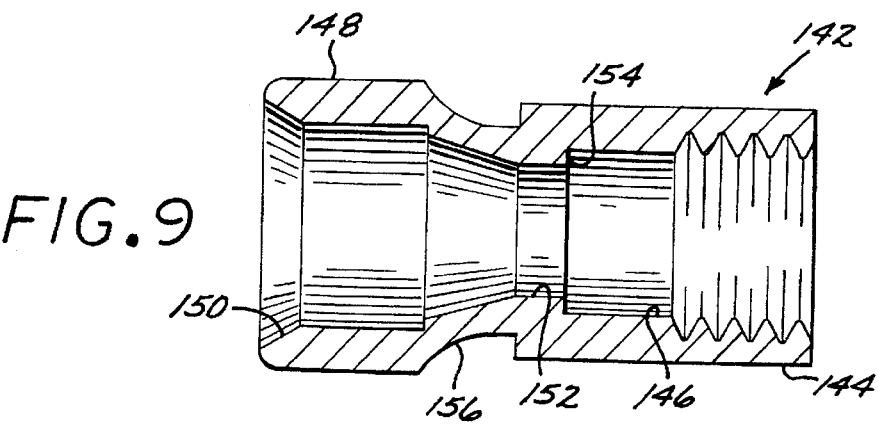
FIG.9
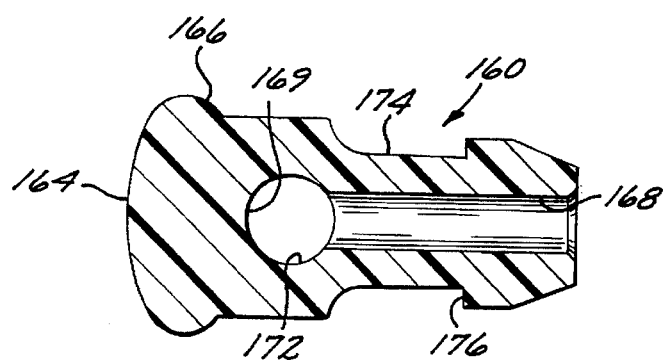
FIG.10
FIG.11
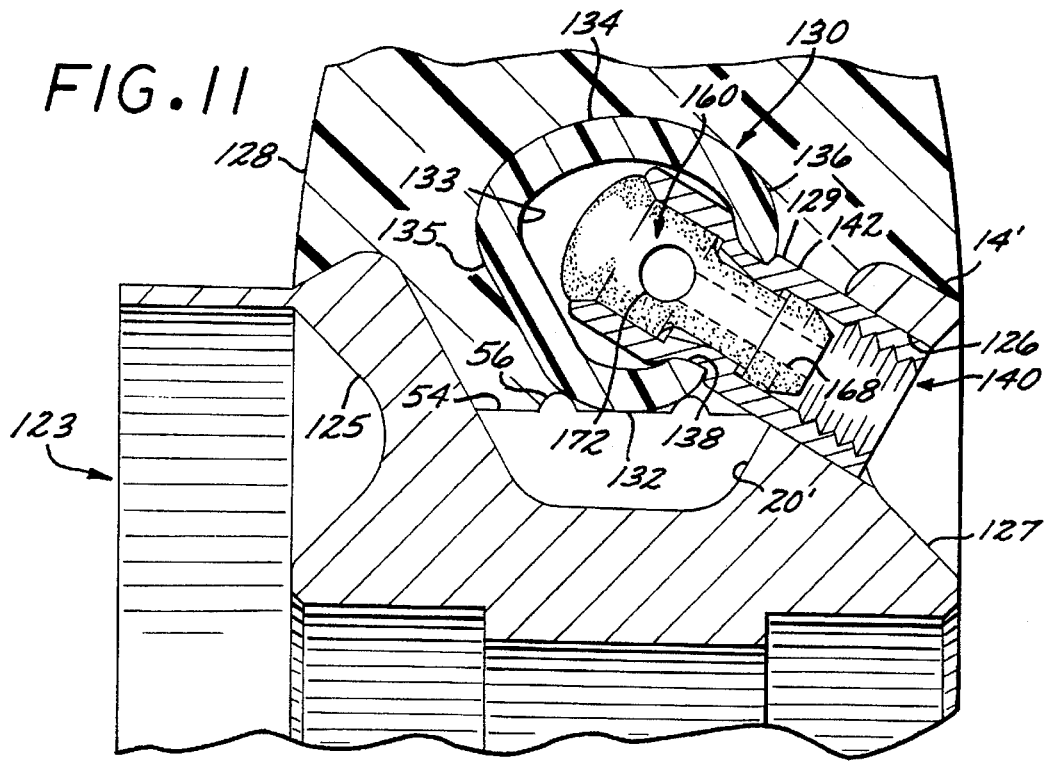

PNEUMATIC IN-LINE SKATE WHEEL

This application is a continuation-in-part of copending application Ser. No. 08/354,374, filed Dec. 12, 1994, titled PNEUMATIC IN-LINE SKATE WHEEL.

BACKGROUND OF THE INVENTION

1. Field of the Invention

The invention relates to in-line roller skates and more particularly to a pneumatic in-line skate wheel of integral construction.

2. Description of the Prior Art

In-line roller skating combines the excitement of ice skating with the mobility of running. Enabling recreational access to a wide variety of surfaces, the sport allows an individual to traverse sidewalks, roads, and other rollable surfaces. In-line skating owes its name to the wheel configuration of the skate itself. Arranged longitudinally one behind the other, the wheels rotate in the same longitudinally oriented vertical plane, creating an experience similar to ice skating, where the blade resides in one longitudinal plane.

Wheels designed for in-line roller skating often include, generally, a hard plastic hub around which is mounted a soft elastomeric tire. Difficulties in preserving a permanent bond between the tire and hub have led to hub arrangements incorporating flanged rims to sandwich the tire sides. Such rims come in a variety of configurations including flat, slightly convex or V-shaped plates. The rims must securely fasten the tire in place while the wheel assembly undergoes the axial and lateral stresses associated with operation. Continued deformation of a tire during rotation tends to cause slipping and breakage from a wheel hub.

One solution to the hub to tire bonding problem proposed a hub to mechanically lock the tire in place. The hub incorporates two side plates clamped together to contain roller bearings in a track surrounding an axle and at the outer edge clamping against the opposite sides of an annular tire rib. A device of this type is disclosed in U.S. Pat. No. 1,618,496 to Ware. Although beneficial for its intended use, this design is unsatisfactory for present day high performance wheels requiring a positive lock of the tire in position.

Providing a hub and bearing assembly about an axle tube and circumscribed by annular rings, U.S. Pat. No. 1,697,485 to Ware, discloses a different solution to locking a tire to a hub. The annular rings are clamped at their radially outer extremities against the opposite sides of a tire configured with laterally disposed tire seats. Once again, this design, while beneficial, is unsuited for high performance in-line roller skating use.

A recently disclosed solution to the hub breakage problem incorporates a hub having a mounting flange with bores onto which the tire sits. Hub rims sandwich the tire to the mounting flange and hub bolts secure the tire to the annular rim and flange. Although well suited for in-line roller skating due to the structural rigidity brought about by this design, this arrangement fails to provide a structurally sound pneumatic tire arrangement.

The increase in popularity of in-line roller skating among people of all ages and sizes has necessitated the design consideration for a wheel having adjustable performance characteristics. In-line skating wheels generally come in one size with a predetermined tire resiliency. The performance of these tires depends upon many factors, including the skater's weight and skill level, the rolling surface and the weather. A skater's weight and skill level are fairly predictable, enabling the skater to select the proper performing tire to match those considerations. However, the rolling surface and the weather are often unpredictable, thus illustrating the need for a tire having adjustable performance characteristics.

Tire rotation along a surface is the result of friction acting tangent to the point of contact between a tire and a rolling surface, and opposite to the direction of an externally applied force upon the tire. The frictional force inhibits the tire from sliding across the surface thus causing the tire to roll. The magnitude of a frictional force is generally material dependent and proportional to the weight bearing down upon the point of contact. From a performance perspective, friction can be both an asset and a liability. As a positive characteristic, an increase in friction allows a tire to grip a surface more easily, enabling sharper cornering and wet weather use. On the negative side, an increase in friction equates to less speed along a surface. Therefore, it can be seen that a tire capable of adjustably influencing the amount of friction acting on it offers a user flexibility within the tire's performance spectrum.

Although speed and gripping capability are important performance characteristics for an in-line skating wheel, shock absorption is also an important criterion. Energy absorbed by a tire as a result of traversing bumps or rocks is prevented from shocking a users knees, thus avoiding a potentially dangerous situation. Skate wheels currently on the market exhibit a certain amount of resiliency within the tire such that a predetermined amount of shock absorption is available. This predetermined level of absorption is dependent upon a persons weight. Therefore, the need exists for an improved skate wheel capable of offering an adjustable level of shock absorption protection for individuals of all weights and sizes.

Efforts to solve the problem of shock absorption within a skate wheel have been disclosed in several U.S. patents. These solutions contemplate shock absorbing elements within the tire such as hard or soft annular rings intended to create an annular void encased in the wall of one of such rings to provide some degree of shock absorption. Although beneficial in that a certain amount of protection is afforded, these designs fail to afford the degree of shock absorption provided by our construction with the same economy of manufacture.

SUMMARY OF THE INVENTION

A hard, polyurethane hub formed with a pair of axially spaced retainer flanges which together form a drop-center. Received within the hub drop-center is a self distended annular hermetic bladder. Radially encapsulating the bladder and the hub periphery is an elastomeric tire comprised of a material similar to that of the hub but typically somewhat more resilient. In one embodiment, the radially formed tire further includes a tubular passage allowing access to the bladder. A highly resilient elastomeric tubular valve may be sealably inserted into the passage, with one end penetrating the bladder and the other end slightly extruding from the tire exterior surface. Due to the valve's resiliency with respect to the harder tire, the central portion of the valve is compressed together forming an airtight seal. A pressurizing device may access the valve port to inflate or deflate the bladder, causing a corresponding increase or decrease in the resiliency of the tire.

Having the ability to adjust the resiliency of the tire gives a skater the capability to vary the performance characteristics of the skate wheel. By deflating the wheel, the tire becomes more resilient to, when weighted, provide for greater contact area between the tire and the rolling surface for better traction. Such a characteristic is beneficial for rough, loose or wet surfaces where traction is of utmost concern. In addition, shock absorption capability would be increased. For operation over smoother support surfaces, the tire may be inflated to a higher pressure so the composite tire becomes less resilient to minimize tire squat thereby enhancing the load carrying capability and resulting in a smaller contact interface between the tire and the rolling surface. Thus the wheel will present less resistance to rolling on the support surface. Such a characteristic is important for competitive speed skating. In addition, manufacturing and inventory expenses can be dramatically reduced since one style of wheel would be adjustable to serve the performance requirements for a wide array of skaters of different physical characteristics and ability.

The wheel is fabricated by incorporating injection molding techniques into the assembly thereof. First, the bladder is looped into the hub drop-center and centered within an annular array of locator nipples. The resulting hub subassembly is placed into a mold having an ellipsoidal cavity corresponding to the eventual shape of the tire. In one embodiment, the mold includes a removable axially extending frusto conical needle to form the valve passageway within the tire to be formed. Once enclosed within the mold, high temperature liquid urethane is introduced, filling the ellipsoidal cavity enclosing the bladder and hub drop-center area. The exothermic curing process heats the air within the bladder causing it to expand thus distending the walls of such bladder causing it to more firmly grip the drop center to cooperate in holding such bladder centered as the curing process continues. The bladder is preferably also of polyurethane material to also chemically bond to the tire body to cooperate in forming a structurally integral system. The compatibility of the hub material and the tire material causes the high temperature urethanes to form a virtually unbreakable bond between the tire and hub flanges during the curing process. Following the curing process, the bladder may be punctured and a tubular valve inserted into the passage created by the mold needle.

In a second embodiment, the skate wheel of the present invention includes a triangular in cross section core in the form of a bladder and a poppet style pneumatic valve. The valve includes a rigid valve barrel terminating at its distal end in a distally facing annular poppet seat and formed medially with an annular groove to be received in close fit relation in a bore formed in the wall of the bladder. A valve core mounts in the barrel and includes at its distal end a resiliently drawn and releasable poppet in sealing engagement with the poppet seat to control fluid flow to the bladder air chamber. The core is formed with a blind axial bore opening to the proximal end of the barrel and joining distally with a laterally formed cross throughbore to establish fluid communication to the interior of the bladder. To inflate, an inflation needle is inserted through the axial bore to drive against the back side of the poppet to deform the resilient core to re-align the cross bore with the axial bore and distend the poppet upwardly and outwardly from the barrel seat to allow the needle to fluidly communicate with the bladder.

In a third embodiment of the skate wheel of the present invention, the tire body encases an annular extruded thermo resilient core formed with a plurality of individually sealed plastic polyurethane annular air chambers disposed substantially about a common axis to define a cushion.

Other features and advantages of the invention will become apparent from the following detailed description, taken in conjunction with the accompanying drawings, which illustrate, by way of example, the features of the invention.

BRIEF DESCRIPTION OF THE DRAWINGS

FIG. 1 is a perspective view of an in-line roller skate wheel of the present invention;

FIG. 2 is a perspective view of a hub incorporated in the skate wheel shown in FIG. 1;

FIG. 3 is an enlarged transverse sectional view taken along line 3—3 of FIG. 1;

FIG. 4 is a further enlarged partial sectional view taken along line 4—4 of FIG. 3;

FIG. 5 is a further enlarged partial sectional view taken along line 5—5 of FIG. 3;

FIG. 6 is a block diagram illustrating a preferred method of manufacturing the skate wheel shown in FIG. 1;

FIG. 7 is a cross sectional view, in enlarged scale, of the hub included in the wheel shown in FIG. 1 as nested in a mold;

FIG. 8 is a cross sectional view similar to FIG. 7 but showing the tire molded on the hub;

FIG. 9 is a longitudinal sectional view of a valve barrel incorporated in a second embodiment of the roller skate wheel of the present invention;

FIG. 10 is a longitudinal sectional view of a valve core to be fixedly mounted in the barrel shown in FIG. 9;

FIG. 11 is a partial transverse sectional view, in reduced scale, of the second embodiment of the skate wheel incorporating the valve constructed from the barrel and core of FIGS. 9 and 10;

DETAILED DESCRIPTION OF A PREFERRED EMBODIMENT

Figure 12:
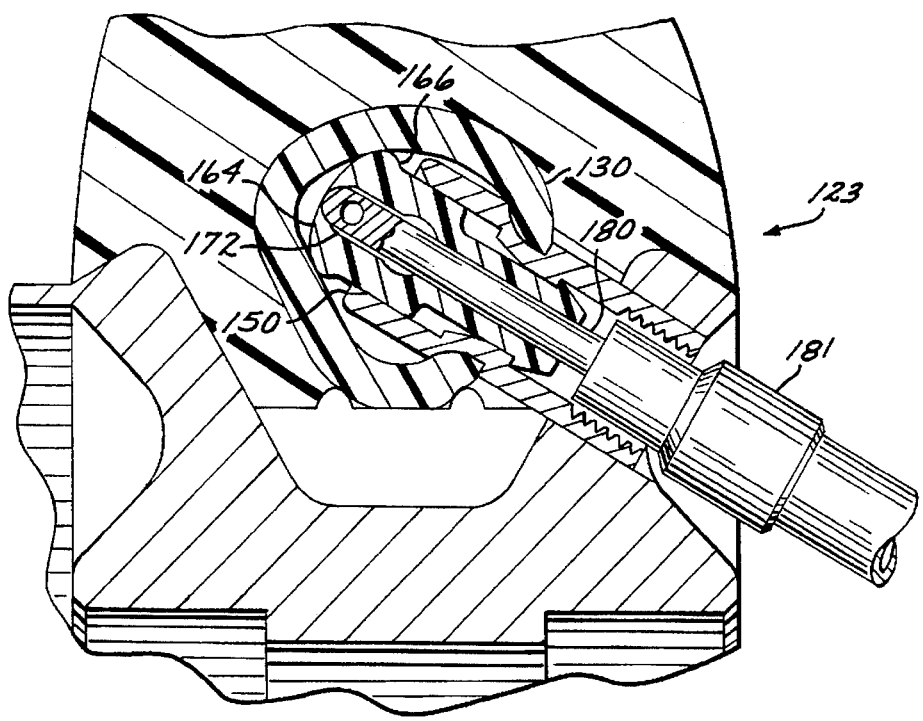
FIG. 12 is a cross sectional view similar to FIG. 11 illustrating the alternative valve in an open position.

Currently available in-line roller skate wheels generally comprise a hard plastic hub surrounded by a tough polyurethane tire body. Various flanging arrangements exist to help keep the tire from breaking away from the hub and exposing the skater to potential injury. The tire body is designed to a predetermined resiliency and reflects a specific band of performance parameters for proper operation under certain conditions. Such conditions include, speed, cornering and shock absorption characteristics. Skaters desiring different performance characteristics have in the past been forced to change skate wheels to achieve satisfactory results. The present invention enables a skater to vary the performance parameters of a skate merely by adjusting the pressure in an air chamber within the tire of a skate wheel. In addition, the present invention incorporates a novel bonding technique designed to positively hold a pneumatic wheel on its hub to thus protect the skater from potential injuries arising out of tire separation.

As shown in the drawings for purposes of illustration, a first embodiment of the present invention is a pneumatic in-line skating wheel 2 with an adjustably resilient tire 4 annularly encasing an integrally bonded hub 6. Encapsulated within the tire is an annular air bladder 8 centrally spaced. A valve 10 positioned within the tire allows access to the air bladder for inflation or deflation thereof. The wheel assembly is fabricated using injection molding techniques with the hub and tire formed from materials known to form strong chemical bonds when sufficiently heated. During the molding and curing processes, an exothermic reaction within the air bladder is conveniently employed to distend the bladder causing it to firmly embrace the drop center of the hub. Hardness differentials between the valve and the tire provide for hermetic sealing of the assembly without the need for additional seals or gaskets.

The hub is constructed of hard polyurethane, typically have a durometer index of 65D and includes a central axle bore 21 configured at its opposite ends with countersunk cylindrical bearing assembly cavities 24 and 26 configured to receive the outer races of respective bearing assemblies for riding on the skate axle. The hub is formed with axially spaced apart, radially projecting flanges 12 and 14 which radiate outwardly from a drop center 20 angling outwardly along radially and axially outwardly tapered surfaces 46 and 48 to then turn axially outwardly to form radially outwardly facing flat bead seats 32 and 34. Conveniently, the axial exterior surfaces of the flanges 12 and 14 are configured with annular indentations configured concentric with the axle and axially indented 36 and 38.

The drop center is formed with a peripheral configuration of somewhat of a sawtooth shape to define angularly shaped stand off ribs 52 radiating outwardly to respective stand off apexes 54.

Formed on the respective apexes are axially spaced apart positioning hubs 56 (FIG. 2) which serve in practice to center the bladder during the molding process as will be described hereinafter.

The stand off teeth 52 are conveniently formed with axially projecting bores 42 disposed equidistant thereabout and countersunk on their opposite ends 44 for receipt of axially projecting screws (not shown).

It will be appreciated that the hub is integrally formed of a single piece of hard polyurethane having high strength properties. The material used to form the hub is carefully chosen to produce the highest degree of bonding strength during the fabrication process with the tire body. A preferred embodiment of the present invention uses thermoplastic polyurethane (TPU) as the material of choice. It will be appreciated that careful selection of the proper polyurethane materials to form the hub and the tire will create a permanent high temperature bond during the fabrication process without the need for any extraneous bonding means such as epoxies or glues. Such a bond created between the two components virtually results in a single integrally formed unit.

Referring to FIGS. 3 and 4, the bladder 8 is constructed of approximately 60 A durometer thermoplastic polyurethane to give it a soft, toroidal, self-distended shape to embrace the tips 54 of the hub ribs 52 annularly within the arrayed locator nipples 56 projecting therefrom. Sitting annularly within the drop-center 20, the bladder exterior is completely exposed except for the points of contact with the hub teeth. Due to the triangular shape of the teeth, only the tip of each tooth contacts the bladder, thus keeping the unexposed portions of the bladder to a minimum. It will be appreciated that this degree of exposure will provide, except for the respective contact points, a relatively complete encapsulation of the bladder within the tire body and simultaneously provide bonding with the polyurethane material of such bladder as well as to the surface area between the tire body and the hub to form a structurally integral system. It will further be appreciated that a predetermined volume of air is trapped within the bladder to cooperate with the wall thereof to provide sufficient ambient pressure to keep the bladder self distended and to expand upon heating during the wheel fabrication process such that the bladder maintains a constant position around the hub. As will be understood by those skilled in the art, the bladder itself may be constructed of a material such that the wall thereof will provide sufficient structural integrity to be self distending.

Referring to FIGS. 1 and 3, the tire body 4 is toroidally formed from a resilient thermoset polyurethane material, such as an MDI based polyurethane, to be chemically similar to the hub 6 material. Due to the fabrication process described hereinafter involved in the molding the tire body, the inner diameter of the tire body at the drop center 20 and the radial walls at the flange surfaces 46 and 48 bond positively to the hub to completely encapsulate the bladder between the tire and hub to form an air retaining capsule independent of the subsequent integrity of the bladder itself.

Formed to project axially and radially outwardly in the tire body 4 is a valve bore 66 having an outwardly opening frusto conically shaped passage 68. The passage extends from the tire body exterior 60 to the upper surface of the encapsulated bladder 70. Received within the passage is an elastomeric, open ended tubular valve 72 constructed of a more resilient urethane than the tire body and formed with a narrow compressible neck 74 to be compressed radially inwardly by the more rigid tire body. The cross section of the valve is oversized with respect to the passage so that the softer material will be compressed by the polyurethane tire body. One end 76 of the valve penetrates into the bladder 8, which is accessed during the fabrication process. The other end 78 slightly protrudes from the tire body exterior for ease of access. Midway through the passage lies a slightly enlarged cavity 80 which opens up into the neck. The cavity serves to define the neck opening that undergoes compression within the tire body. It will be appreciated by those skilled in the art that the hardness differential between the tire body and the valve will normally compressible close the valve at the neck, resulting in an airtight seal internally and externally. The bladder may be forcibly accessed using an appropriately hollowed needle for inflation or deflation of the bladder. Additionally, due to the hermetic construction of the tire body around the bladder, the air tight capacity of the wheel is not necessarily dependent on the bladder. Thus, various embodiments may integrate the bladder in the tire body.

It will be appreciated that one embodiment of the skate wheel of the present invention exhibits adjustable performance parameters. By varying the amount of air within the bladder, speed, traction, and shock absorption characteristics of the skate wheel may be substantially altered. Inflation or deflation of the bladder correspondingly makes the tire body less resilient or more resilient. A stiffer, less resilient tire body translates into a faster, slicker, and bumpier ride. A softer, more resilient tire body translates into a slower, grippier and relatively shock resistant ride. Further, skaters of different sizes and weights may purchase the same wheels and adjust them respectively to achieve the same skating experience.

FIGS. 6, 7 and 8 illustrate a preferred method of making the wheel and one form of mold that may be used for this purpose with occasional additional reference to FIGS. 1–3. According to the preferred method, a hard thermoplastic polyurethane hub 6 and a soft, elastic toroidal air filled bladder 8 are selected as at 82 (FIG. 6). The hub construction is important in that the material must be structurally rigid and such that it will afford a high integrity chemical bond with the material selected for the tire body. In a preferred embodiment, the bladder must be of a type having a hermetically sealed air filled annular cavity preferably formed of endless thermoplastic polyurethane rubber tubing. The bladder is selected at 84 and stretched over one of the flanges and looped around the hub drop center as at 86 and carefully aligned within annularly arrayed locator nub 56 which tend to maintain such bladder centrally located within the axial dimension of the drop center 20. It will be appreciated that such bladder, in some embodiments, may be constructed of a material with limited distensible characteristics so that it may be pre-pressurized so that it will inherently maintain the desired gaseous pressure therein to thus provide the desired tire performance characteristics without the necessity of valving.

An open-cast mold 90 is provided at 88 to form the tire body annularly around the resulting hub/bladder subassembly during the polyurethane casting operation. The mold includes a rectangularly formed housing 92 having upper and lower halves 94 and 96. The upper half 94 is formed with an upward opening frusto-conically shaped pour hole defining a gate 98 extending downwardly into a downwardly facing half toroidally formed cavity 100. The lower half is formed with an upwardly facing half toroidally formed cavity 102 having an upstanding cylindrical centering stub 104 disposed centrally therein. Such lower half further includes an upwardly opening blind bore 105 angling radially and axially inwardly for slip fit receipt therein of the base end of a tapered male valve passage mold pin 106 to maintain external access to the air cavity insert during the polyurethane casting operation. The two halves, when joined, form an enclosed toroidal chamber 108 with an access opening.

Upon installation of the bladder 8 around the hub 6 the resulting sub-assembly is placed centrally within the mold at 110. The polyurethane casting operating continues with the pouring of a predetermined volume of liquid thermoset polyurethane into the conical opening 98 of the mold at 112. The urethane is at a temperature sufficiently elevated to allow high viscosity of the material. For the preferred embodiment, the polyurethane is maintained in a molten state at a temperature of about 140° C. to, when poured on the hub at room temperature, reacting with such hub to form the desired bond. Once poured, the liquid thermoset seeps around and into the pockets formed by the hub drop center ribs 52. It will be appreciated that the ribs, by supporting the bladder 8 and forming therebetween seepage pockets, provide a major bonding area radially inwardly of the tire body and about the hub drop center. After the liquid thermoset is poured, a plug (not shown) may be inserted in the gate opening 98 to abut the formed bottom end thereof with the liquid polyurethane forming the sides of the tire to establish the desired finished form. The mold 90 is set aside to allow the assembly to cure as at 114 (FIG. 6).

During the curing process, which generally takes from one to three (hours), several important physical transformations take place which are critical to the present invention. First, following introduction of the hot liquid urethane, the air filled bladder 8 itself heats up, causing an expansion of the air within the bladder. The resultant exothermic reaction heats the entrapped air expanding the bladder to cause it to firmly grip the drop center 20 thereby maintaining such bladder distended and firmly centering it between the centering necks 56 (FIG. 3) to support it against dislodgement during the conclusion of the pour process and during the curing stage. The second transformation occurring during curing is the hardening of the thermoset polyurethane into the tire body. Most importantly, however, is the chemical bonding which takes place between the hub thermoplastic and the tire body thermoset during curing.

Formed of chemically similar materials, the hub 6, bladder 8 and the tire body 4 fuse together during the curing process, forming an integral unit. The high temperature of the liquid thermoset causes a microscopic layer of the hub thermoplastic to liquify and permeate into the adjacent thermoset. Likewise, the adjacent thermoset microscopically permeates into the thermoplastic. As the resulting mixture hardens, the previous hub to liquid urethane boundary is replaced by a fused integrally formed tire body and hub. It will be appreciated that the chemical bond formed between the bladder, hub and the tire body virtually fuses the components together into a single integral unit without the use of extraneous and potentially unreliable bonding agents. With the advent of adjustable performance wheels, and the increasingly harsher stresses associated therewith, a stronger and more reliable hub to tire bond is a necessity.

Following the curing process, the mold 90 is carefully opened, and the resulting wheel removed at 116. A needle-like tool is inserted into the valve passage so as to puncture the bladder at 118. Next, a tubular, soft valve 10 is installed on an insertion tool, and inserted at 120 into the valve passage 68. The valve is inserted far enough into the passage to allow access to the bladder interior. Since the valve is formed of a relatively soft polyurethane material, the harder tire body will act to compress the valve closed, thus effectively keeping the bladder sealed. However, the bladder may still be accessed for inflation or deflation by inserting a suitable tubular needle into the valve opening. In practice, it will be appreciated that the valve may be of any conventional type, may be formed integral with the bladder and, in some embodiments, where subsequent adjustments in pressure are not sought, will not be necessary.

Assembly of the pneumatic in-line skating wheel is completed following final trimming of the rough product at 122. Any excess urethane "flash" is trimmed to make the tire body smooth and free from rough edges. The wheel is now ready for installation onto an in-line roller skate.

Figure 13:
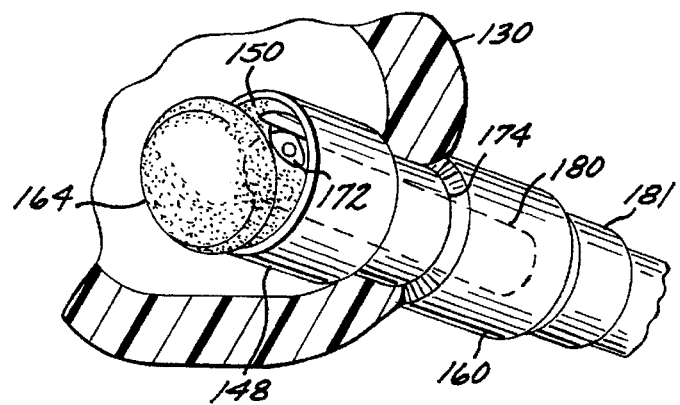
FIG. 13 is a partial perspective view, partially in section, of the valve shown in FIG. 12.

The second embodiment of the pneumatic skate wheel 123 shown in FIGS. 11, 12 and 13 is similar to that shown in FIGS. 1–5 and includes, generally, a hub 125 and a tire 128 configured similarly to the hub 6 and tire 4 arrangement of FIG. 3, with an alternative embodiment in the form of an air bladder 130 in fluid communication with a poppet style pneumatic valve 140.

Referring to FIG. 11, the hub 125 incorporated in the second embodiment of the skate wheel 123 includes all of the features of the hub 6 shown in FIG. 3 and is further formed with a valve insertion bore 126 angling axially inwardly and radially outwardly at an angle perpendicular through a side flange 127. It will be appreciated that the bore may be formed during the molding process or may be bored subsequent thereto.

As illustrated in FIG. 10, an air bladder 130 radially surrounds the hub 125 and is constructed of approximately 70 A durometer thermoplastic polyurethane to give it a slightly more rigid self distended shape than the aforedescribed bladder 8 of FIG. 3. The bladder is formed with a rounded equilaterally triangular cross section to define a radially inwardly facing relatively narrow apex 132 seated against the radial outer extremity of the hub ribs. Also defined by the bladder cross section, and disposed opposite the narrow apex is a wide bladder tread wall 134 defining the bladder radial outer extremity. The bladder cross section interior is formed by rounded equiangular corners 133 joined by the outer bladder wall 134 and two axially outwardly diverging bladder side walls 135 and 136. Formed in the lateral bladder side wall 136 is a throughbore 138 aligned with the valve insertion bore 126. As will be apparent below, an important advantage of the cross sectional shape of the bladder is the fact it affords a long dimension in the axial direction of the valve to afford clearance at the distal end of such valve. Consequently, other polygonal configurations will be apparent to those skilled in the art for achieving the same results.

Formation of the bladder triangular cross section may be achieved by subjecting a circular polyurethane tube to an elevated temperature while snugly fitted into a triangular in cross section cavity formed into an annular mandrel (not shown). The thermoplastic nature of the bladder material responds to the elevated temperature by softening and molding to the mandrel cavity. In one embodiment, the polyurethane is molded in a mold cavity to form confronting annular halves which are subsequently bonded together to form the composite bladder. In one embodiment, the valve is formed integral with one of the halves.

Referring to FIGS. 9–13, an alternative embodiment of the pneumatic valve 140 includes, generally, a valve barrel 142 and a resilient valve core 160. The valve barrel, as illustrated in FIGS. 9 and 11, is formed at its proximal end with an axially outwardly opening threaded socket 146 for receiving the neck of an inflation needle housing 181 (FIG. 12) and a distal end terminating in a distally opening conical poppet seat 150. The barrel is formed medially with a reduced in diameter interior collar 152 to define an annular shoulder 154 facing outwardly toward the proximal end 144. Intermediately formed externally around the barrel is an annular groove 156 received in, and resiliently embraced by the bladder throughbore 138. A preferred rigid material for the valve barrel is hard plastic such as nylon but, in practice it has been found that 2011/2024 aluminum works well.

Referring to FIGS. 10 and 11, the valve core 160 is mounted medially in the valve barrel and is formed distally with an enlarged in cross section circular poppet 164 having an axially outwardly facing rounded shoulder 166 complementally formed to seal against the poppet seat 150. A blind axial bore 168 is formed centrally in the core to open outwardly to the proximal end to receive the shank of an inflation needle 180 carried from the housing 181 and terminates at its inner end in a stop 169. A laterally formed cross bore 172 intersects the axial bore at the stop to establish fluid communication between the axial bore and the lateral side of the core. Formed medially around the core is an annular neck 174 to define at one end an inwardly facing annular step 176.

The material used to form the core must be of sufficient resiliency and restorability to be repeatedly deformed in response to insertion of an inflation needle, and return to its original configuration as the needle is removed. In this regard, a preferred material for constructing the core is Elastollan 1185A-10 NAT, which is an ether-based thermopolyurethane.

The tire 128 incorporated in the second embodiment of the skate wheel 123 is similar to the aforedescribed tire and is formed with a valve bore 129 to project axially and radially outwardly from the bladder bore 138 interposed in axial alignment between the bladder bore and the valve insertion bore 126 formed in the rim flange.

Assembly of the second embodiment of the skate wheel of the present invention is similar to that for the first embodiment, with the bladder 130 selected and stretched over one of the hub flanges and looped around the hub drop center such that the bladder apex 132 is carefully aligned within the annularly arrayed locator hubs. The hub and bladder subassembly is then placed into a mold cavity where the tire 128 is cast to annularly surround the resulting hub/bladder subassembly and bond to the hub flanges. A counter sink boring tool is then introduced into the rim bore 126 to bore a slightly undersized bore in the tire body and form the bore 138 in the bladder with a relaxed diameter about half that of the valve barrel. The valve distal end is then inserted through the insertion bore 126 and pressed through tire bore 129 and into the bladder bore 138 to stretch such bladder bore such that the pierced bladder wall 136 grips the outer annular groove 156 of the valve barrel. The finished skate wheel is then pre-pressurized to a standard inflation level during the assembly process, then packaged and distributed to retailer outlets.

Skaters endeavoring to customize the performance of the skate wheel 123 may merely select a hand pump with the conventional pump needle 180 (FIGS. 12 and 13) projecting from a needle housing 181. As shown in FIGS. 12 and 13, the skater will slidably insert the needle into the core axial bore 168 and apply a slight inwardly axial force to advance the needle therethrough. The core 160 frictionally maintains a bias against the advancing needle and remains mountingly positioned in the barrel 142 through the abutting engagement of the core annular shoulder 176 against the barrel annular step 154. Progression of the needle to the end of the bore 168 will cause the needle to engage the stop 169 and deformably stretch the core axially outwardly into the bladder, lifting the poppet 164 off the poppet seat 150. Continued travel of such needle through such core will typically tend to distort the shape of the distal end of such core causing one diametrical half of such cross bore 172 to substantially align axial with the axial bore 168 allowing the tip of the needle to slidably progress into such half of the cross bore. The realignment of the cross bore causes a corresponding radially outward deformation of the poppet into one of the rounded equiangular corners 133 of the bladder inner walls as the needle progresses through the cross bore and into the bladder at which time fluid communication is established therebetween.

Once inflation of the bladder 130 to the desired pressure is completed, the needle 180 is slidably removed from the core 160, at which time the restorable properties of the core cooperate with the substantial pressure differential acting across the poppet 164 to instantly sealingly re-seat the poppet onto the poppet seat 150 to positively maintain the customized pressure level obtained within the skate wheel bladder. The substantially instantaneous sealing effect of the poppet and tendency of the high pressure in the bladder to drive the poppet into positive sealing engagement with the seat are very important since even a very small leak out of the relatively small volumed bladder results in a substantial decrease in air pressure and loss of wheel performance.

Referring to FIGS. 11 and 12, it will be appreciated that the triangular-in-cross section shape of the bladder 130 exhibits advantages in this combination over a round bladder having a comparable parametrical wall. As noted in FIG. 11, with the valve projecting perpendicular to the plane of the flange 14' to extend perpendicularly through the bladder side wall 136 to terminate the barrel 142 short of the distal corner of such bladder, substantial clearance is provided for radial deformation of the poppet 164 as it lifts away from the seat 150. This extra clearance enables the poppet to nest into a rounded corner and allow the needle 180 to more easily access the bladder and reduce engagement stresses on the core 160. Furthermore, the triangular cross section of the bladder allows the radial outer tread wall to be embedded radially deeper in the tire body 128, thereby maintaining greater tire body radially exterior of the bladder to provide for greater stability.

Figure 14:
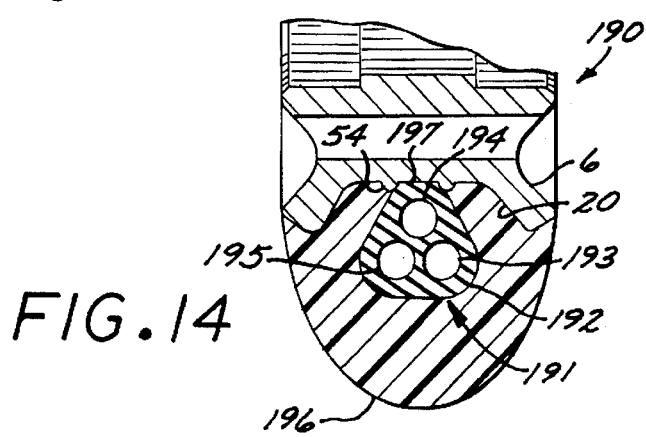
FIG. 14 is a partial transverse sectional view of a third embodiment of the skate wheel of the present invention.

A third embodiment of the skate wheel of the present invention, generally designated 190, and illustrated in FIG. 14, is intended as a pre-pressurized version of the aforementioned skate wheel embodiments and includes the hub 6 of the first embodiment and an integral bladder 191 annularly looped around the hub and annularly surrounded by a tire 196.

The bladder 191 comprises a resilient annular core 192 of approximately 70A durometer hardness with a substantially symmetrical annular triad of individually sealed air chambers 193, 194 and 195 disposed radially within the bladder core and symmetrically about the bladder central axis. The density of the extruded material is such that the air chambers are impermeable to the trapped air confined therewithin. The bladder is formed with a triangular cross section of solid polyurethane encasing the annular chambers arranged in a balanced triangular pattern with the radially inner chamber 194 disposed in the plane of the axial center of the tire and the radially outer chambers 193 and 195 spaced equidistant on either side of such plane. The core may be fabricated by extruding a straight strip of formed thermoplastic polyurethane, cutting the strip to length and welding the ends together to form an annular configuration such that one of the triangular edges forms the innermost radial portion of the bladder to define an apex 197 around the radially inner chamber 194. In the preferred process, the polyurethane will be molded in rings defining the opposite halves of the bladder and those halves then fused together to form the composite bladder. This procedure traps air within the air chambers to hold the bladder at ambient pressure. The material used must be of sufficient density and molecular structure to be impermeable to air.

Assembly of the third embodiment of the skate wheel 190 of the present invention is substantially similar to the aforedescribed embodiments with the bladder 191 placed around the hub drop center 20 such that the apex 197 aligns annularly within the hub rib nubs 54. The hub/bladder sub-assembly is then placed in a mold where the tire is annularly cast substantially around the bladder and the hub drop center to form the resulting skate wheel.

Advantages of the third embodiment include a reduced cost of manufacture resulting from a decrease in the number of parts and a reduction in assembly steps and assembly time required for fabrication. This results in a passed along cost savings to skaters who prefer the economy and consistency of an unpressurized design, but who desire the advantages arising from a pneumatic in-line skate wheel. Additionally, the extruded design of the bladder incorporated in the third embodiment is stronger structurally to more fully withstand the stresses acting on the weld joining the two ends of the bladder together. Furthermore, separating the pneumatic feature of the present invention into separately sealed chambers preserves the pneumatic functionality of the wheel should one of the chambers become pierced or damaged.

From the foregoing, it will be apparent that the pneumatic tire of the present invention provides a high integrity tire assembly in which the pressure in the pressure cavity may be easily adjusted and which will allow for the skate ride afforded by a pneumatic tire without the shortcomings normally associated with a pneumatic tire. Thus, the expense of fabrication and of inventorying numerous different tires of different physical characteristics is reduced.

Various modifications and changes may be made with regard to the foregoing detailed description without departing from the spirit of the invention.

What is claimed is:

1. A pneumatic in-line roller skate wheel comprising:

a relatively rigid urethane hub formed with an annular drop-center having axially spaced apart retainer flanges;

stand off ribs disposed in annular spaced relation about said drop center;

an annular bladder surrounding said drop center and stood off from said drop center by said ribs to form an air chamber; and a relatively soft molded urethane tire body substantially surrounding said bladder and formed with laterally opposite sides bonded to said retainer flanges.

2. A pneumatic in-line roller skate wheel according to claim 1 wherein:

said bladder comprises a resilient annular bladder formed with a plurality of pre-pressurized individually sealed annular air chambers disposed substantially about a common axis.

3. A pneumatic in-line roller skate wheel according to claim 2 wherein:

said bladder is formed of a substantially triangular cross section.

4. A pneumatic in-line roller skate wheel according to claim 2 wherein:

said bladder is in the form of an extruded thermoplastic material.

5. A pneumatic in-line roller skate wheel according to claim 1 to be inflated by an inflation needle carried from a needle housing wherein:

said hub is formed with side flanges that angle radially and axially outwardly at a predetermined angle;

said bladder is configured with a triangular cross section to define said walls projecting radially and axially outwardly at said predetermined angle from an apex seated on said hub;

a valve bore angling axially inwardly and radially outwardly through one of said side flanges, through said tire body and through one of said side walls;

a valve including a rigid barrel received in said bore and terminating at its interior end within said bladder in an annular valve seat, and at its opposite end in a needle housing socket, a resilient core in said barrel and projecting interiorly therefrom past said seat to form a circular poppet normally seated on said seat, said resilient core further formed with an axial bore projecting inwardly from said socket to terminate in a stop, a cross bore leading from said axial bore to the periphery of said resilient core behind said poppet, said resilient core having sufficient resiliency to normally draw said poppet against said seat and to, upon insertion of said needle in said axial bore and engagement with said stop, lift said poppet off said seat to establish an air communication path from said cross bore to exhaust in the space between said poppet and said seat.

6. A pneumatic in-line roller skate wheel according to claim 5 wherein:

said bladder is formed with a substantially triangular cross section having a rounded interior corner spaced from said valve seat.

7. A pneumatic in-line roller skate wheel according to claim 5 wherein:

said hub, said tire and said bladder are formed of thermoplastic polyurethane.

8. A pneumatic in-line roller skate wheel according to claim 5 wherein:

said valve barrel is formed of a metal, and said resilient core is formed of thermoplastic.

9. An adjustably resilient pneumatic in-line roller skate wheel to be inflated by an inflation needle and comprising:

a relatively rigid urethane hub formed with an annular drop-center and axially spaced apart retainer flanges, one of said flanges including a throughbore;

a plurality of stand off ribs disposed in annular spaced relation about said drop center and formed with pairs of nub tabs spaced axially from a central plan in said drop center;

an annular air bladder surrounding said drop center and formed of a substantially triangular cross section and stood off from said drop center by said ribs and aligned axially between the tabs of the respective said pairs surrounding said drop center, said bladder formed with a bladder bore aligned axially with said throughbore;

a relatively soft molded urethane tire body formed with laterally opposite sides bonded to said retainer flanges and configured to surround said bladder, said tire body being further formed with a valve bore aligned axially with said bladder bore and said throughbore; and a pneumatic valve sealably received in said throughbore bladder bore and valve bore and including a rigid valve barrel formed with a distal end and a proximal end, said distal end being formed with an annular seat, and a resilient core fixed medially in said barrel and free of said barrel on said distal end, said resilient core being formed at said distal end with an enlarged in cross section poppet normally seated in said seat, said resilient core being further formed with a blind axial bore open to its proximal end for receipt of said needle and closed at its distal end to define a stop and a cross bore leading from said axial bore to the lateral side of said resilient core, said resilient core having sufficient resiliency to, upon insertion of said needle through said axial bore, engage said stop and push said poppet to be spaced away from said seat for fluid communication between said needle and the space between said poppet and seat.

\* \* \* \* \*